(12) United States Patent
Oh et al.

(10) Patent No.: US 9,101,909 B2
(45) Date of Patent: Aug. 11, 2015

(54) LIQUID COMBUSTION CATALYST COMPOSITION COMPRISING AN IONIZED METAL COMPOUND

(75) Inventors: Mi Hye Oh, Jeollabuk-do (KR); Na Hyeon Ryu, Jeollabuk-do (KR); Yeon Seok Ryu, Jeollabuk-do (KR); Hwan Woo Ryu, Jeollabuk-do (KR)

(73) Assignee: Mi Hye Oh, Jeollabuk-Do (KR)

( * ) Notice: Subject to any disclaimer, the term of this patent is extended or adjusted under 35 U.S.C. 154(b) by 0 days.

(21) Appl. No.: 13/880,662

(22) PCT Filed: Oct. 20, 2011

(86) PCT No.: PCT/KR2011/007828
§ 371 (c)(1),
(2), (4) Date: Apr. 19, 2013

(87) PCT Pub. No.: WO2012/053835
PCT Pub. Date: Apr. 26, 2012

(65) Prior Publication Data
US 2013/0210616 A1   Aug. 15, 2013

(30) Foreign Application Priority Data
Oct. 20, 2010 (KR) .................. 10-2010-0102601

(51) Int. Cl.
*B01J 27/25* (2006.01)
*B01J 21/02* (2006.01)
*B01J 21/10* (2006.01)
*B01J 23/06* (2006.01)
*B01J 23/34* (2006.01)
*C10L 1/12* (2006.01)
*C10L 10/00* (2006.01)
*B01J 31/26* (2006.01)
*B01J 21/18* (2006.01)
*B01J 23/02* (2006.01)
*B01J 35/00* (2006.01)
*B01J 37/00* (2006.01)

(52) U.S. Cl.
CPC *B01J 27/25* (2013.01); *B01J 21/02* (2013.01); *B01J 21/10* (2013.01); *B01J 21/18* (2013.01); *B01J 23/02* (2013.01); *B01J 23/06* (2013.01); *B01J 23/34* (2013.01); *B01J 31/26* (2013.01); *B01J 35/002* (2013.01); *B01J 37/0018* (2013.01); *C10L 1/1266* (2013.01); *C10L 10/00* (2013.01); *C10L 2200/0213* (2013.01); *C10L 2200/0236* (2013.01); *C10L 2200/0259* (2013.01); *C10L 2230/04* (2013.01)

(58) Field of Classification Search
USPC ........................................... 502/172
See application file for complete search history.

(56) References Cited

U.S. PATENT DOCUMENTS

| 2,460,700 | A | * | 2/1949 | Dempsey ...................... 123/1 A |
| 2,994,190 | A | * | 8/1961 | Burton ............................ 60/214 |
| 4,749,382 | A | * | 6/1988 | Collins et al. ................... 44/354 |
| 5,861,354 | A | * | 1/1999 | Clubb et al. .................. 502/340 |
| 8,287,607 | B2 | * | 10/2012 | Carroll et al. .................. 44/354 |
| 2004/0079925 | A1 | | 4/2004 | Shouji et al. |
| 2006/0121398 | A1 | * | 6/2006 | Meffert et al. .................... 431/4 |

FOREIGN PATENT DOCUMENTS

| JP | 2006-029701 | 2/2006 |
| KR | 10-1997-0010866 B1 | 7/1997 |
| KR | 10-0544568 B1 | 1/2006 |
| KR | 100690553 B1 | 2/2007 |
| KR | 10-2009-0130962 A | 12/2009 |

OTHER PUBLICATIONS

PCT/KR011/007828 International Search Report.

* cited by examiner

*Primary Examiner* — Melvin C Mayes
*Assistant Examiner* — Kenneth Vaden
(74) *Attorney, Agent, or Firm* — Timothy E. Nauman; Fay Sharpe LLP

(57) ABSTRACT

Provided is a liquid combustion catalyst composition comprising an ionized metal compound, and more particularly, to a liquid combustion catalyst composition comprising an ionized metal compound, in which the ionic metal compound is added to fuel burning in a combustion engine to quickly achieve a chemical thermal equilibrium condition required for the combustion of fuel such as hydrocarbon fuel, fossil fuel and biomass, and to optimize the amount of air which contains oxygen required for the equilibrium condition in terms of chemical equivalence, thereby improving thermal efficiency and the efficiency of the combustion engine so that fuel consumption for a heat source can be reduced, and optimizing the combustion performed by the combustion device by controlling the generation of sludge, clinker and fouling which may be generated due to an inorganic substance so that a combustion rate per unit area and the productivity of the combustion device can be improved. Provided is a liquid combustion catalyst composition comprising an ionized metal compound or a complex ionic combustion catalyst composition which comprises an ionized metal compound and which has a hydrate form dried at 100° C. or less, wherein the composition is characterized in that one or more metal compounds selected from Mg, Ca, Mn, and Zn are dissolved in nitric acid or ammonia water to form one or more metal ions selected from Mg, Ca, Mn, and Zn.

12 Claims, No Drawings

LIQUID COMBUSTION CATALYST COMPOSITION COMPRISING AN IONIZED METAL COMPOUND

This application is a 35 USC 371 national stage entry of international PCT/KR2011/007828, filed 20 Oct. 2011, which claims the priority benefit of Korean Application No. 10-2010-0102601, filed 20 Oct. 2010.

TECHNICAL FIELD

The present invention relates to a liquid combustion catalyst composition comprising an ionized metal compound, and more particularly, to a liquid combustion catalyst composition comprising an ionized metal compound, in which the ionic metal compound is added to fuel burning in a combustion engine to quickly achieve a chemical thermal equilibrium condition required for the combustion of fuel such as hydrocarbon fuel, fossil fuel and biomass, and to optimize the amount of air which contains oxygen required for the equilibrium condition in terms of chemical equivalence, thereby improving thermal efficiency and the efficiency of the combustion engine so that fuel consumption for a heat source can be reduced, and optimizing combustion performed by the combustion device by controlling the generation of sludge, clinker and fouling which may be generated due to an inorganic substance so that a combustion rate per unit area and productivity of the combustion device can be improved.

BACKGROUND ART

In general, four requisites of the combustion for a combustion engine particularly, a boiler, which uses hydrocarbon fuel and fossil fuel, are air (oxygen), fuel, heat and a chimney. Among the requisites, the fuel is composed of an organic matter which is burned, and an inorganic matter (ash) which is not burned. However, in a case where the efficiency of combustion is increased by increasing a combustion speed of the organic matter to increase thermal efficiency, a high temperature of more than a melting point of the inorganic matter (the ash) is formed in the combustion engine, and thus the inorganic matter (the ash) is melted and is fused in the combustion engine, thereby causing heat loss by reducing heat transfer at the same time as obstructing driving of the combustion engine.

As a fuel system, which has been recently used in the combustion engine, there is a pulverized coal injection (PCI) system. The pulverized coal injection system enables combustion efficiency of the combustion engine to be improved by injecting a pulverized coal obtained by the cracking of a low-grade coal in an inner part of the combustion engine along with a heat wind in order to improve productivity per a unit capacity of the combustion engine and reduce a fuel price.

However, the pulverized coal injection system is disadvantageous that it would be difficult to normally drive the combustion engine because thermal efficiency and productivity of the combustion engine are reduced due to a sticking material generated from the ash melted in the combustion engine upon combustion using fossil fuel (coal and the like) which is a heat source.

Accordingly, it would be preferable to use a chemical method rather than a physical method in order to increase the efficiency of combustion in the combustion engine. Recently, an additive composition for increasing the efficiency of the combustion engine through a chemical reaction using an additive has been emerged as the chemical method.

In connection with this, to improve the efficiency of the combustion engine, a combustion promotion catalyst and an oxygen compound have been added to fuel used in the pulverized coal injection system, and thus a technology (i.e. Korean Laid-Open Patent Publication No. 10-2002-0075758) for improving the combustion efficiency and thermal efficiency of the combustion engine was developed. Also, as an alkali metal catalyst in which an alkali metal and a compound having oxygen are mixed has been used as a combustion promotion catalyst, a combustion reaction has been promoted, and an initial deformed temperature has been reduced, thereby inducing stable driving of the combustion engine and realizing high productivity.

However, the alkali metal as the conventional additive may function to promote combustion in the combustion state of a high temperature. However, it would be normally difficult to manage it at room temperature without a special device. Since an alkali oxide, which provides oxygen, is also unstable at room temperature, it would be difficult for it to exist in a liquid state. Thus, since the alkali oxide is used in a solid state and a non-ionic state, it is problematic that it would be difficult to show proper combustion efficiency. Accordingly, the additive composition in a liquid state having excellent stability and a strong ionic property has been urgently required.

DETAILED DESCRIPTION OF THE INVENTION

Technical Problem

The present invention has been made keeping in mind the above problems. An aspect of the present invention provides a liquid combustion catalyst composition comprising an ionized metal compound, in which the ionic metal compound is added to fuel burning in a combustion engine to quickly achieve a chemical thermal equilibrium condition required for the combustion of fuel such as hydrocarbon fuel, fossil fuel and biomass, and to optimize the amount of air which contains oxygen required for the equilibrium condition in terms of chemical equivalence, thereby improving thermal efficiency and the efficiency of the combustion engine so that fuel consumption for a heat source can be reduced, and optimizing the combustion performed by the combustion device by controlling the generation of sludge, clinker and fouling which may be generated due to an inorganic matter so that a combustion rate per unit area and the productivity of the combustion device can be improved.

Technical Solution

According to an aspect of the present invention, there is provided a liquid combustion catalyst composition comprising an ionized metal compound, wherein the composition is characterized in that one or more metal compounds selected from Mg, Ca, Mn and Zn are dissolved in a soluble liquid to form one or more metal ions selected from Mg, Ca, Mn and Zn.

Also, the liquid in which the metal compounds are dissolved may be a nitric acid or ammonia water.

Also, the liquid in which the metal compounds are dissolved may further include a surfactant selected from solbitol and glycerine so that the metal compound is dissolved and dispersed.

Also, the liquid combustion catalyst composition comprising the ionized metal compound may further include a boron compound.

Also, the liquid combustion catalyst composition comprising the ionized metal compound may further include alkali metal compounds.

Also, the alkali metal compounds may be one or more alkali metal compounds selected from the group consisting of K, Na and Li, and an alkali metal may be present in a positive (+) ion state in the liquid combustion catalyst composition.

Also, the alkali metal compounds may be one or more alkali metal compounds elected from the group consisting of a hydroxide-based compound, a carbonic acid-based compound and an oxide-based compound.

Advantageous Effects

According to the liquid combustion catalyst composition comprising the ionized metal compound according to the present invention, because the ionized metal and alkali metal as a composition added to the fuel are present in the liquid in a liquid state while forming an ionized state, they are widely distributed in the fuel so that an oxidation reaction and a combustion reaction are promoted, and this causes the generation of a high temperature, thereby enabling combustion efficiency and thermal efficiency to be improved.

Also, even though less fuel is used, high combustion efficiency and thermal efficiency are achieved. Thus, as the used amount of fuel is generally reduced, the cost of materials can be minimized. Furthermore, as the amount of fuel is reduced and the generation of a sticking material in the combustion engine is controlled, productivity of the combustion engine can be maximized.

BEST MODE FOR CARRYING OUT THE INVENTION

The technical element of the present invention is characterized by a liquid combustion catalyst composition comprising an ionized metal compound, in which one or more metal compound selected from Mg, Ca, Mn and Zn is dissolved in a soluble liquid to form one or more metal ions selected from Mg, Ca, Mn and Zn.

Also, it is characterized in that the liquid in which the metal compound is dissolved may be nitric acid or ammonia water.

Also, it is characterized in that the liquid in which the metal compound is dissolved may further include a surfactant selected from solbitol and glycerine so that the metal compound is dissolved and dispersed.

Also, it is characterized in that the liquid combustion catalyst composition comprising the ionized metal compound may further include a boron compound.

Also, it is characterized in that the liquid combustion catalyst composition comprising the ionized metal compound may further include alkali metal compounds.

Also, it is characterized in that the alkali metal compounds may be one or more alkali metal compounds selected from the group consisting of K, Na and Li, and an alkali metal may be present in a positive (+) ion state in the liquid combustion catalyst composition.

Also, it is characterized in that the alkali metal compounds may be one or more alkali metal compounds selected from the group consisting of a hydroxide-based compound, a carbonic acid-based compound and an oxide-based compound.

Hereinafter, it will be specifically explained about the liquid combustion catalyst composition comprising an ionized metal compound according to the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

First, a technical idea of the present invention is to promote the combustion reaction, $C+O_2 \rightarrow CO_2$, of carbon among an organic matters with the best small amount of air through a complexed metal ion to adjust a catch fire point and to increase the velocity of combustion to form a high temperature, thereby capable of reducing heat loss due to the amount of air, and improving the efficiency of combustion and an effective value of heat transfer energy.

Also, in the present invention, even though the inorganic matter (i.e. the ash) in the fuel is subjected to a high temperature, an initial deformed temperature (IDT) of the inorganic matter (the ash) is increased and the inorganic matter becomes soft, whereby the inorganic matter is prevented from being melted and fused onto a wall of the combustion engine. Thus, by stabilizing the temperature in the combustion engine, thermal efficiency of the combustion engine is improved.

For this, the liquid combustion catalyst composition comprising the ionized metal compound according to the present invention is a liquid composition in which one or more metal compounds selected from Mg, Ca, Mn and Zn are dissolved in a soluble liquid to form one or more metal ions selected from Mg, Ca, Mn and Zn.

The above Mg, Ca, Mn and Zn function to increase an IDT of the inorganic matter (the ash), are used for combustion by being combined with the boron (B) and alkali metal of an ionic state in a complex ion form, and are maintained in a stable liquid form even at room temperature.

The boron (B) has a property that changes to a solid material when it is combined with other materials. Furthermore, the boron is acidity, but has lower viscosity than the oxide of Si and Fe. Thus, when the boron is combined with other materials or forms an oxide, it expands and becomes crumbly, thereby providing a property that is easy to break (i.e. a fragile property).

Accordingly, when Mg, Ca, Mn and Zn, which form a high fusion point compared to an alkali metal, are dissolved in the ionic state of a liquid state, a complex-ion bond and uniformity can be easily performed by using the boron (B). Phosphorous (P) having a strong splitting property and a complex-ion property may be used in place of the boron (B).

Also, a liquid in which Mg, Ca, Mn and Zn are dissolved may be also dissolved in hydrochloric acid or sulfuric acid. However, since the hydrochloric acid or the sulfuric acid causes corrosion and discharges air pollutants, it would be preferable to use nitric acid or ammonia water.

The liquid combustion composition further includes alkali metal compounds. An alkali metal which forms the alkali metal compounds means six elements such Rb, Cs and Fr as well as K, Na and Li having similar properties to each other, and reacts with water at room temperature to generate hydrogen, thereby generating a hydroxide which is a strong alkali. More specifically explaining it, the alkali metal is infirm metals having a silver-white color, loses its gloss in the air and has a low specific gravity, a low melting point and a low boiling point. Furthermore, the alkali metal works actively and directly with many nonmetallic elements while showing a flame reaction. In particular, the alkali metal is well combined with oxygen and the like and reacts with hydrogen to form a hydride.

Also, when the alkali metal is usually neglected in air as it is, the alkali metal has property that reacts with moisture (e.g. $CO_2$ and the like) in the air and functions to promote combustion as a catalytic agent for providing a transition state (i.e.

a thermal equilibrium state), which is necessary for the oxidation of other materials, while being rapidly ionized in the combustion state of a high temperature compared to other metal elements or the elements (N, C, S and the like) of other materials included in fuel. In particular, upon the combustion reaction of carbon, $C+O_2 \rightarrow CO_2$, the alkali (Li, K and Na) metal functions to promote the combination of oxygen and carbon.

The alkali metal compounds are composed of one or more alkali metal compounds selected from the group consisting of K, Na and Li among 6 elements of the alkali metal.

The alkali metal compounds may be composed of one or more alkali metal compounds selected from the group consisting of K, Na and Li or may be composed of the mixture of two or more alkali metal compounds.

When the alkali metal compounds are configured such that two or more metal compounds are mixed, combustion promotion resulting from an ionic character and a catalytic character increases, thereby providing the effect that the combustion promotion function are more improved. Thus, it would be preferable to use the alkali metal compounds which are configured such that two or more metal compounds are mixed.

When the alkali metal compounds are configured such that two or more metal compounds are mixed, two or more alkali metals selected from K, Na and Li which are the alkali metals of the metal compounds may be mixed and used. One or more alkali metals (K, Na and Li) of the metal compounds and one or more alkali metals selected from Rb, Cs and Fr which are other alkali metals may be mixed and used.

The alkali metal compounds are composed so that the ionized alkali metal is present in a positive (+) ion state. That is, as the alkali metal compounds are ionized in a liquid state and are present in an ionic state such as $K^+$, $Na^+$ and $Li^+$ in the liquid (water), the alkali metal compounds are widely distributed in a mineral matter such as fuel, ash and the like, thereby enabling combustion to be promoted.

Furthermore, the alkali metal compounds may be composed of one or more alkali metal compounds selected from the group consisting of a hydroxide-based compound, a carbonic acid-based compound and an oxide-based compound.

In a case where the alkali metal compounds are composed of the hydroxide-based compound, the carbonic acid-based compound or the oxide-based compound, when low quality fuel, in which $Al_2O_3$ is included in quantity, among fuels, is combusted, the obstruction of a melting action caused by $Al_2O_3$ is prevented. That is, the alkali metal compounds enable the efficiency of combustion to be improved by promoting the formation of calcium ferrite when the low quality fuel is combusted.

The hydroxide-based compound is composed of one or more compounds selected from the group consisting of KOH, NaOH and LiOH. As OH is dissolved upon combustion, the hydroxide-based compound enables the efficiency of carbon conversion to be improved, thereby increasing the efficiency of combustion, and enables a sticking material generated upon the combustion to be easily removed or the generation of the sticking material to be controlled by reducing a melting point of $Al_2O_3$ contained in fuel.

The carbonic acid-based compound is composed of one or more compounds selected from the group consisting of $K_2CO_3$, $Na_2CO_3$, $Li_2CO_3$, $KHCO_3$, $NaHCO_3$ and $LiHCO_3$.

In a case where the alkali metal compounds are composed of the carbonic acid-based compound, $CO_2$ is generated upon combustion. More specifically explaining it, $CO_2$ generated by the carbonic acid-based compound increases the efficiency of combustion by actively reacting with carbon while coming into contact with a surface of the fuel which is a heat source.

The oxide-based compound is composed of one or more compounds selected from the group consisting of $K_2O$, $Na_2O$, $Li_2O$, $K_2O_2$, $Na_2O_2$, $Li_2O_2$, $KNO_3$, $NaNO_3$ and $LiNO_3$. Furthermore, the oxide-based compound functions to promote a reaction with carbon by generating oxygen upon combustion, thereby enabling the efficiency of combustion and thermal efficiency to be improved by generating a high temperature.

However, since the alkali (Li, K and Na) metal itself is unstable at general room temperature and in the water, it would be difficult to keep, maintain and use it. Furthermore, the alkali metal reacts with the organic matter (the ash) in the combustion engine during combustion and thus reduces an initial deformed temperature of the ash, thereby obstructing driving of the combustion engine and reducing thermal efficiency.

Accordingly, because Mg, Ca, Mn and Zn are present in a state of being dissolved into the form of $K(NO_3).Mn(NO_3)_2.16H_2O$ or $K(NO_3).Zn(NO_3)_2.15H_2O$, which is a complex ion compound combined with the alkali metal (Li, K and Na), it is convenient to handle them, and they have excellent stability and an excellent fuel contact capability. Thus, when the metals in an element unit and an ionic state are used as a catalyst, the metals work with a carbon atom in the fuel in a combustion state even with the very small amount of non-uniform catalyst (about 0.01~0.1% in comparison of fuel), thereby enabling the effect of the present invention to be achieved.

Furthermore, the dissolved Mg, Ca, Mn and Zn are oxidized as MgO, CaO, MnO and ZnO, respectively, which are oxides having a high initial deformed temperature, and thus are bonded to the surface of the ash while surrounding the ash and prevent the ash from being melted and fused by increasing an initial deformed temperature (IDT) of an external surface of the ash even though the ash is a material having a low initial deformed temperature, thereby enabling the alkali metal (Li, Na and K) to form a high temperature in the combustion engine and combustion efficiency to be improved.

Like this, as the complex ion compound is used, the alkali metal, which comes rapidly and widely into contact with the surface of the fuel, exists as an ion compound including oxygen, thereby functioning to promote combustion. The causes of promotion are because of: first, an increase in calorie and the formation of a high temperature resulting from a catalytic action of the alkali metals (Li, Na and K) and a reduction in pulverized coal by the catalytic action; second, the provision of radical oxygen; third, a reduction in inhaled heat and the formation of a high temperature resulting from a reduction in the amount of air; and fourth, an increase in calorie resulting from an oxidation process ($M+O \rightarrow MO$) of the alkali metal and a metal. Furthermore, fifth, because the particle surface of solid fuel combusted in a promotion reaction of combustion forms a high temperature, and the alkali metal promotes the combustion reaction sequentially in neighbouring particles and transmits a chain of high temperature to each particle surface, the combustion promotion effect can be achieved even with the complex metal and complex ion compounds in a small quantity.

Furthermore, the complex-ion compound forms a crystal in a hydrate form and makes the clinker and fouling into a porous and solid material with vapor ($H_2O$ and OH) generated from the hydrate upon initial combustion so that they are controlled from being melted and fused onto the wall and body of the combustion engine.

Like this, to make the ash into porosity, in a case where the hydrate of boron or phosphorous except for the complex-ion compound such as $K(NO_3).Mg(NO_3)_2.9H_2O$ is added to fuel, an eliminating time for clinker, fouling, sintering and sludge increases compared to a case in which only $K(NO_3).Mg(NO_3)_2.9H_2O$ is used.

Also, in a case where the complex-ion compound is used in a liquid state by dissolving it, a catch fire point is more reduced than that of a case in which the complex-ion compound is used in a state of being not dissolved, and a speed which reaches the effective value of heat transfer energy also increases, thereby enabling pulverized coal to be reduced and thermal efficiency to be improved. Furthermore, $SO_x$ which is an air pollutant may be reduced, and the amount of air which is necessary for initial combustion may be also reduced.

The kind of fuel to which the composition of the present invention is added is neither specially restricted nor limited. All fuels such as solid fuel (e.g. coal, coke, biomass, etc.), liquid fuel (e.g. paraffin oil, diesel, coal tar, crude oil, liquefied petroleum, etc.), gaseous fuel (e.g. hydrocarbon-based fuels such as natural gas and the like), which are applied to combustion, may be used.

Reviewing a method of manufacturing the liquid combustion catalyst composition comprising the ionized metal compound according to the present invention as described above, one or more metal compounds selected from the group consisting of Mg, Ca, Mn and Zn are dissolved in nitric acid, and one or more alkali metal compounds (KOH, NaOH, LiOH, $K_2CO_3$, $Na_2CO_3$, $Li_2CO_3$, etc.) and/or one or more boron compounds (borax, boric acid, boron trioxide, boron dioxide, $NaBO_3$, etc.) are selectively dissolved. The compounds exist as the complex-ion compound in a nitric acid solution (having concentration of 15 to 65%, ammonia water is also available).

Next, a pH value for preventing precipitation and maintaining solubility is about 1 to 8, but a pH value for preventing the corrosion of a metal material such as iron should be managed in a range of about 3 to 7. Since the complex-ion compound is present in a liquid state at room temperature, the compound has excellent stability, and thus it is convenient to use it.

When the property of atom and metal ions owned by the complex-ion compound is used in a combustion state, the complex-ion compound is absorbed and adhered onto the surface of fuel in a molecular unit or an ionic state, and the alkali metal dissolved during the combustion promotes the reaction, $C+O_2 \rightarrow CO_2$, $CO_2$ of an organic matter, particularly, carbon (C), in an atomic unit and an ionic state. The alkali metal dissolved during the combustion and Mg, Ca, Mn, Zn and B are changed to an oxide during the combustion, but are absorbed and adhered onto the surface of ash, thereby preventing the generation of melting while increasing the initial deformed temperature of the ash and enabling the effective value of heat transfer energy to be improved by controlling the generation of clinker, fouling and sintering.

To the liquid combustion catalyst composition of the present invention, the surfactant selected from solbitol and glycerine may be added so that the composition is dissolved and dispersed in atomic and molecular units in an ionic state.

An appropriate use rate of the liquid combustion catalyst composition according to the present invention is that the liquid combustion catalyst composition, water and fuel are mixed in the rate of 1~4:1~5:1000. However, only the rate is not required. The rate may be appropriately adjusted as needed. That is, an increase in efficiency may be realized by increasing the use rate of the liquid combustion catalyst composition of the present invention with respect to the fuel.

Also, an increase in the controlling capability of the clinker and fouling may be realized by increasing the ion metal compound of Mg, Ca, Mn and Zn, and an increase in combustibility may be realized by increasing the alkali metal ion compound (K, Na and Li).

In particular, when the compositions produced as described above are dried to a degree (at 100☐ or less), the compositions become transparent crystals (hydrates) in which an ionic bond between them is performed. Even though the crystals are used, the same effect is generated because the ionic state is maintained.

MODE FOR CARRYING OUT THE INVENTION

Hereinafter, through the examples, combustion states before and after adding the liquid combustion catalyst composition according to the present invention were experimented and measured.

Example 1

Experiment for Initial Deformed Temperature

Sample 1: A liquid combustion catalyst composition was produced by mixing a nitric acid of 50 g having concentration of 70% in water of 100 g, and then dissolving a magnesium oxide of 8 g, and thereafter mixing a borax of 10 g, thereby ionizing them.

Sample 2: A liquid combustion catalyst composition was produced by mixing a nitric acid of 50 g having concentration of 70% in water of 100 g, dissolving a magnesium oxide of 8 g, and then mixing $K_2CO_3$ of 3 g, thereby ionizing them.

Sample 3: A liquid combustion catalyst composition was produced by mixing a nitric acid of 50 g having concentration of 70% in water of 100 g, dissolving a magnesium oxide of 8 g, and then mixing $B_2O_3$ of 3 g, thereby ionizing them, and after 30 minutes, mixing $K_2CO_3$ of 3 parts by weight with respect to the liquid of 100 parts by weight in which the magnesium oxide and $B_2O_3$ are mixed.

Sample 4: A liquid combustion catalyst composition was produced by mixing a nitric acid of 50 g having concentration of 70% in water of 100 g, dissolving a zinc oxide of 8 g, and then mixing $B_2O_3$ of 4 g, thereby ionizing them, and after about 30 minutes, mixing $K_2CO_3$ of 3 parts by weight with respect to the liquid of 100 parts by weight in which the zinc oxide and $B_2O_3$ are mixed.

Sample 1, sample 2, sample 3 and sample 4 were produced and prepared, respectively. After obtaining coal imported from China and being native to Daedong, which is the place of origin, and removing moisture the coal, the coal, water and the liquid combustion catalyst composition were mixed in the rate of 1000:5:2. The results in which the initial deformed temperature (IDT) was tested by the ASTM D 1857 method are shown in table 1 below.

TABLE 1

| | Non- | Addition of liquid combustion catalyst composition | | | | | | |
|---|---|---|---|---|---|---|---|---|
| Division | addition | Sample 1 | Difference | Sample 2 | Difference | Sample 3 | Difference | Sample 4 | Difference |
| IDT | 1330.4 | 1345.5 | 15.1 | 1341.2 | 10.8 | 1337.5 | 7.9 | 1340.4 | 10.0 |

Initial Deformed Temperature (IDT)

As shown in table 1 above, in sample 1 corresponding to a case in which the liquid combustion catalyst composition of the present invention is added to fuel, the initial deformed temperature, which is a temperature that melting begins, was increased up to 15.1□ compared to the case of non-addition, namely the case in which the composition is not added to the fuel. In sample 2, the initial deformed temperature was increased up to 10.8□ compared to the case of non-addition. In sample 3, the initial deformed temperature was increased up to 7.9□ compared to the case of non-addition. In sample 4, the initial deformed temperature was increased up to 10.0□ compared to the case of non-addition. That is, it could be confirmed that when the ionized composition of the present invention is used, it is effective to increase the initial deformed temperature.

Example 2

Experiment for Thermal Efficiency (Boiler Efficiency and Plant Efficiency)

Sample 1: A liquid combustion catalyst composition was produced by mixing a nitric acid of 50 g having concentration of 70% in water of 100 g, dissolving a magnesium oxide of 7 g, and then mixing a borax of 10 g, thereby ionizing them.

Sample 2: A liquid combustion catalyst composition was produced by mixing a nitric acid of 50 g having concentration of 70% in water of 100 g, dissolving a magnesium oxide of 7 g, and then mixing $K_2CO_3$ of 10 g, thereby ionizing them.

Sample 1 and sample 2 are shown in table 2 below by calculating the boiler efficiency and plant efficiency according to the following test conditions and measurement method.

1. Test Conditions

1) The liquid combustion catalyst composition was not injected for one day (April 20), in sample 1, the composition was injected for one day (April 22), and in sample 2, the composition was injected for one day (April 23). Under this condition, combustion was performed.

2) An injection method and rate: The coal, water and liquid combustion catalyst composition were injected in the ratio of 1000:5:1 on the coal above a coal conveyer belt through a jet nozzle before pulverizer.

3) Boiler: Ultra-high critical pressure and multi tube type (TWO PASS TYPE) Coal fired PC boiler (generation capacity: 500 MW/h, steam amount: 1605 Ton/h, BLR control: Integrated Control (ICMS) TELEPERM XP (Siemens), SH/RH: (255K/569□)/(55K/596□)

2. Measurement Method

1) Boiler Efficiency: ASME Code Boiler Efficiency (%)= (heat output/heat input)×100

2) Plant Efficiency: [Generation Quantity (MWh)]/(The amount used of coal/h)×[Calorie (Kcal/kg)/860,000]×100 (* Note: 1 MW=860,000 kcal)

TABLE 2

Thermal Efficiency (Boiler Efficiency, Plant Efficiency)

| | | | | April 20 (Non-addition) | | April 22 (Sample 1) | | April 23 (Sample 2) | |
|---|---|---|---|---|---|---|---|---|---|
| OUTPUT | Electricity | KW/h | | 499,707.62 | | 498,630.20 | | 490,451.62 | |
| | | kcal/h | | 429,671,197.60 | | 428,744,786.62 | | 421,712,473.01 | |
| | Steam | kcal/h | | 980,554,554.79 | | 973,079,159.74 | | 949,801,441.43 | |
| INPUT | HHV (As Fired Base) | | Division | kcal/kg | weight/h | kcal/kg | weight/h | kcal/kg | weight/h |
| | | | Value | 6,091.29 | 185,249 | 5,951.79 | 185,145 | 5,951.79 | 182.127 |
| | | | kcal/h | 1,128,405,381.21 | | 1,101,944,159.55 | | 1,084,595,425.32 | |
| | | | Plant efficiency (%) | | 38.08 | | 38.91 | | 38.88 |
| | | | Boiler efficiency (%) | | 86.90 | | 88.31 | | 87.57 |
| | | Thermal efficiency | Plant efficiency (%) | | 38.08 | | 39.34(+1.26) | | 39.31(+1.23) |
| | | | Boiler efficiency (%) | | 86.90 | | 89.29(+2.39) | | 88.59(+1.65) |

As shown in above Table 2, each boiler efficiency of the $22^{nd}$ day and $23^{rd}$ day when the liquid combustion catalyst composition is added was increased and improved up to 2.39 point and 1.65 point compared to the boiler efficiency of the $20^{th}$ day when the liquid combustion catalyst composition is not added, each plant efficiency was increased up to 1.26 point and 1.23 point, so it could be confirmed that generation efficiency was improved.

Example 3

Experiment for Flame Temperature

By applying sample 1 and sample 2 to be identical to example 2, a flame temperature and a change in pulverized coal were measured with an optical pyrometer which measures the temperature of flame by measuring changes in the wavelength of light generated according to the temperature of flame, and were shown in Table 3.

TABLE 3

| | | Flame Temperature | | | | |
|---|---|---|---|---|---|---|
| | | Non-addition | Addition | | Difference | |
| Division | Subdivision | $20^{th}$ day | $22^{nd}$ day | $23^{rd}$ day | $22^{nd}$ day | $23^{rd}$ day |
| Metal Temp | S Heater(°) | 568.43 | 568.17 | 567.71 | −0.26 | −0.72 |
| | Spray Water(kg/h) | 29,829 | 47,227 | 47,227 | 17,398 | 17,398 |
| | R Heater(°) | 582.24 | 576.56 | 574.40 | −5.68 | −7.84 |
| | Spray Water(kg/h) | 29,829 | 12,079 | 12,079 | −17,750 | −17,750 |
| Maximum Temperature of Flame | ° | | 1361.29 | 1376.86 | 1376.86 | 15.57 | 15.57 |
| $O_2$ % in Flue Gas of Stack | | 5.5 | 4.95 | 4.90 | −0.55 | −0.6 |
| Pulverized coal in Ash | | 7.5 | 6.4 | 6.5 | 0.9 | 1.0 |

As shown in Table 3 above, in a case where the liquid catalyst composition of the present invention is added, the maximum temperature of flame was increased up to 15.57° compared to the case in which the liquid catalyst composition of the present invention is not added, so it could be confirmed that as combustion was promoted, a high temperature was generated. Furthermore, in the case of a surface temperature of the super-heater metal, the temperatures of the $22^{nd}$ day and the $23^{rd}$ day were reduced up to 0.26° and 0.72°, respectively compared to the temperature of the $20^{th}$ day (non-addition). In the case of a surface temperature of the re-heater metal, the temperatures of the $22^{nd}$ day and the $23^{rd}$ day were reduced up to 5.68° and 7.84°, respectively compared to the temperature of the $20^{th}$ day (non-addition). In view of this, it could be confirmed that the effect for eliminating the clinker and fouling was improved compared to the case in which the liquid combustion catalyst composition is not added. In the case of the amount of air, on the $22^{nd}$ day and the $23^{rd}$ day when the liquid combustion catalyst composition is added, the amounts of air were reduced up to 0.55 point and 0.6 point, respectively based on $O_2$, compared to the amount of air of the case in which the liquid combustion catalyst composition is not added.

What is claimed is:

1. A liquid combustion catalyst composition comprising an ionized metal compound with one or more complex ions and a boron compound, wherein the composition is characterized in that one or more metal compounds selected from Mg, Ca, Mn and Zn are dissolved in a soluble liquid to form one or more metal ions selected from Mg, Ca, Mn and Zn.

2. The composition of claim 1, wherein the boron compound is selected from the group consisting of borax, boric acid, boron trioxide, boron dioxide and $NaBO_3$.

3. A liquid combustion catalyst composition comprising an ionized metal compound with one or more complex ions and alkali metal compounds, wherein the composition is characterized in that one or more metal compounds selected from Mg, Ca, Mn and Zn are dissolved in a soluble liquid to form one or more metal ions selected from Mg, Ca, Mn and Zn.

4. The composition of claim 3, wherein the alkali metal compounds are one or more alkali metal compounds selected from the group consisting of K, Na and Li, and alkali metals in the liquid combustion catalyst composition are present in a positive (+) ion state.

5. The composition of claim 4, wherein the alkali metal compounds are one or more alkali metal compounds selected from the group consisting of a hydroxide-based compound, a carbonic acid-based compound and an oxide-based compound.

6. A liquid combustion catalyst composition comprising an ionized metal compound with one or more complex ions, wherein the composition is characterized in that one or more metal compounds selected from Mg, Ca, Mn and Zn, and wherein the liquid in which the one or more metal compounds are dissolved further comprises a surfactant selected from solbitol and glycerine to form one or more metal ions selected from Mg, Ca, Mn and Zn.

7. A method of producing transparent hydrate crystals suitable for use as solid fuels, comprising:
   drying the liquid combustion catalyst composition according to claim 1 at 100° C. or less so as to form transparent hydrate crystals.

8. A method of producing transparent hydrate crystals suitable for use as solid fuels, comprising:
   drying the liquid combustion catalyst composition according to claim 2 is dried at 100° C. or so as to form transparent hydrate crystals.

9. A method of producing transparent hydrate crystals suitable for use as solid fuels, comprising:
   drying the liquid combustion catalyst composition according to claim 3 at 100° C. or less so as to form transparent hydrate crystals.

10. A method of producing transparent hydrate crystals suitable for use as solid fuels, comprising:
    drying the liquid combustion catalyst composition according to claim 4 at 100° C. or less so as to form transparent hydrate crystals.

11. A method of producing transparent hydrate crystals suitable for use as solid fuels, comprising:
   drying the liquid combustion catalyst composition according to claim 5 at 100° C. or less so as to form transparent hydrate crystals.

12. A method of producing transparent hydrate crystals suitable for use as solid fuels, comprising:
   drying the liquid combustion catalyst composition according to claim 6 at 100° C. or less so as to form transparent hydrate crystals.

* * * * *